United States Patent [19]

Abe et al.

[11] Patent Number: 4,939,712

[45] Date of Patent: Jul. 3, 1990

[54] MULTIPLE TRACK AND REVERSING ADDRESS SEARCH METHOD FOR USE IN A DISK PLAYER SYSTEM

[75] Inventors: Hiroyuki Abe; Kazuhiro Kiyoura; Kazunori Matsuo; Takayuki Iijima, all of Kawagoe, Japan

[73] Assignee: Pioneer Electronic Corporation, Tokyo, Japan

[21] Appl. No.: 230,417

[22] Filed: Aug. 10, 1988

[30] Foreign Application Priority Data

Aug. 13, 1987 [JP] Japan ................... 62-202440

[51] Int. Cl.[5] ............................. G11B 21/08
[52] U.S. Cl. ................... 369/32; 369/44.11; 358/907; 360/78.04
[58] Field of Search ............... 369/32, 43–47; 358/342, 907; 360/78.01, 78.04

[56] References Cited

U.S. PATENT DOCUMENTS 4,701,898 10/1987 Giddings ................. 358/342 X
4,774,699 9/1988 Giddings ................. 358/342 X Primary Examiner—Robert L. Richardson
Attorney, Agent, or Firm—Fleit, Jacobson, Cohn, Price, Holman & Stern

[57] ABSTRACT

Address search method for use in a disk player repeatedly performing a track jump operation for jumping over a plurality of recording tracks at one time. The present method changes to a jump state from a locking state in which a tracking servo system of the disk player is locked so that an information reading light spot of a pickup of the disk player follows a recording track. Subsequently, a present address obtained from read output of the pickup is compared with a target address and the tracking servo system is placed in the locking state. The preceding steps for comparing the addresses are repeated until the target address is exceeded by the present address.

5 Claims, 4 Drawing Sheets

Fig. 1
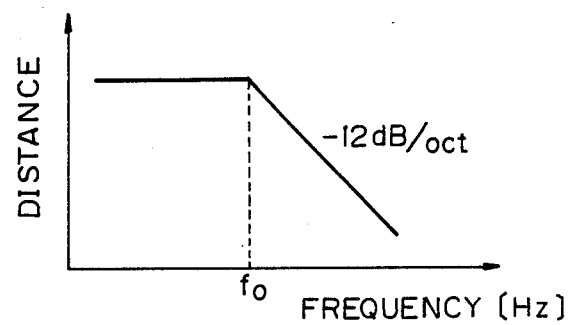
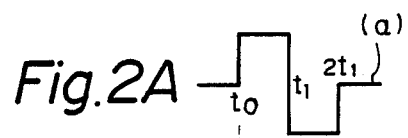
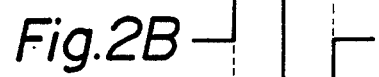
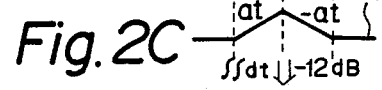
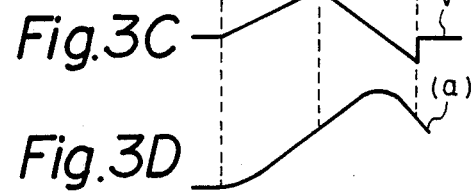
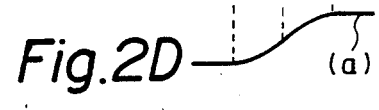
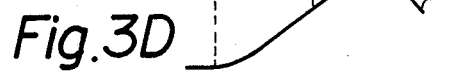

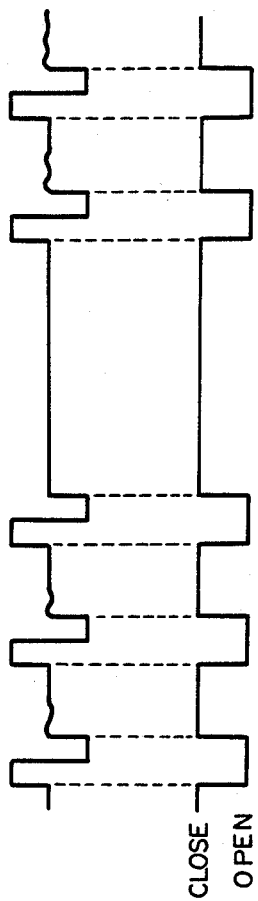
Fig. 5A
Fig. 5B
Fig. 5C
Fig. 5D

MULTIPLE TRACK AND REVERSING ADDRESS SEARCH METHOD FOR USE IN A DISK PLAYER SYSTEM

BACKGROUND OF THE INVENTION

1. Field of the Invention

The present invention relates to an address search method for use in a disk player system.

2. Description of Background Information

Often players for playing an information recording disk (simply referred to as disk hereinafter) such as a video disk or a digital audio disk are provided with an address search function by which an address designated by an operator is searched in a short period of time.

Conventionally, the search operation has been performed in such a manner that an address difference between a present address on the disk at which an information reading light spot is located and a target address designated by the operator is computed, and the information reading spot is moved near to the target address by moving a slider carrying a pickup on the basis of the address difference obtained by the computation, and subsequently a jump pulse which is generated at predetermined intervals is supplied to a tracking actuator, so that a track jump operation through which the information reading light spot jumps over a predetermined number of recording tracks is repeated while performing a comparison between the present address and the target address.

The computation between the present address and the target address is performed by using a microcomputer and the like. However, with the conventional search method as described above, the computation is performed when the address difference is large, so that a lengthy computation program is required.

On the other hand, for this search operation, as mentioned above, it is indispensable to employ the so-called track jump operation by which the information reading spot for reading information on the disc is moved to jump a recording track or recording tracks on the disk. In order to perform the track jump operation, a jump pulse is supplied to a tracking actuator provided for displacing the information reading spot in a direction of disc radius. The application of a jump pulse in the form of a voltage or a current to the tracking actuator means that a corresponding kinetic force is applied to a moving part of the tracking actuator. If a constant kinetic force is applied, a frequency characteristic of the response in distance will become as illustrated in FIG. 1. Therefore, if the frequency of generation of the jump pulse is sufficiently higher than the low frequency resonance frequency $f_0$, the distance of shift by the tracking actuator will have a value corresponding to the double integral of the jump pulse This point will be described specifically with reference to FIGS. 2A through 2D. When a jump pulse (a) as shown in FIG. 2A arrives, the pickup is accelerated at an acceleration factor a during a period from $t_0$ to $t_1$ as illustrated in FIG. 2B. Therefore, the speed v of movement of the pickup increases gradually, and reaches a value $at_1$ ($v=at_1$) at the time $t_1$ ($t=t_1$), as illustrated in FIG. 2B. The pickup is then decelerated by the application of a voltage having the opposite polarity at the time $t_1$, and the speed of movement reaches zero at a time $2t_1$ ($t=2t_1$). The distance traveled by the pickup is equal to $at_1/2$ during the acceleration range, and equal to $at_1/2$ during the deceleration range, and the total distance of shift (d) is equal to $at_1$, as illustrated in FIG. 2D. If the pulse width of the jump pulse (a) is determined so that the above mentioned total distance of shift (d) is equal to the track pitch, the pickup is moved from a recording track to an adjacent track by the application of one jump pulse, and the number of recording tracks over which the pickup is moved by the jump operation is determined by the pulse width of the jump pulse (a).

On the other hand, if a jump pulse having a large pulse width is applied for jumping a large number of recording tracks. e.g., one hundred of recording tracks at one time, the frequency of generation of the jump pulse approaches to the resonance frequency $f_0$ of the actuator, and the response of the pickup will become as illustrated in FIGS. 3A through 3D. As shown in FIG. 3C, the pulse width of the deceleration pulse becomes excessive with respect to the pulse width of the acceleration pulse, and the pickup will be moved back after once reaching to a maximum travel distance, as shown in FIG. 3D.

Therefore, it is necessary to precisely control the pulse width of the deceleration pulse with respect to the acceleration pulse However, the control of the pulse width of the deceleration pulse is not easily performed, and the number of tracks across which the pickup is moved by one track jump operation is limited.

OBJECT AND SUMMARY OF THE INVENTION

The present invention is based on the recognition of the foregoing problem of the conventional address search method, and an object of the present invention is to provide an address searching method for use in a disk player system by which the program steps for computing the address difference can be reduced.

An address search method according to the present invention is characterized in that a track jump operation by which an information reading light spot of the pickup is moved to jump from a present track over a plurality of recording tracks to a target track, from a locking state of the tracking servo system in which the information reading light spot follows a present recording track of the disk, jumps to the target track, and subsequently returns so that the tracking servo system is locked again in the target track, and the present address obtained by a read output of the pickup and the target address is compared, is intermittently performed until the present address exceeds the target address.

BRIEF DESCRIPTION OF THE DRAWINGS

FIG. 1 is a diagram showing a frequency characteristic of a tracking actuator;

FIGS. 2A through 2D are diagrams showing relations among a jump pulse, acceleration, speed and moving distance of the tracking actuator when the frequency of generation of the jump pulse is sufficiently higher than the resonance frequency $f_0$ of the tracking actuator;

FIGS. 3A though 3D are diagrams showing the relations among the jump pulse, the acceleration, the speed and the moving distance when the frequency of generation of the jump pulse is near the resonance frequency $f_0$;

FIGS. 5A through 5D are timing diagrams show charts showing the steps under a jump operation for jumping a plurality of recording tracks.

DESCRIPTION OF A EMBODIMENT

An embodiment of the present invention will be explained in detail with reference to the accompanying drawings.

Figure 4:
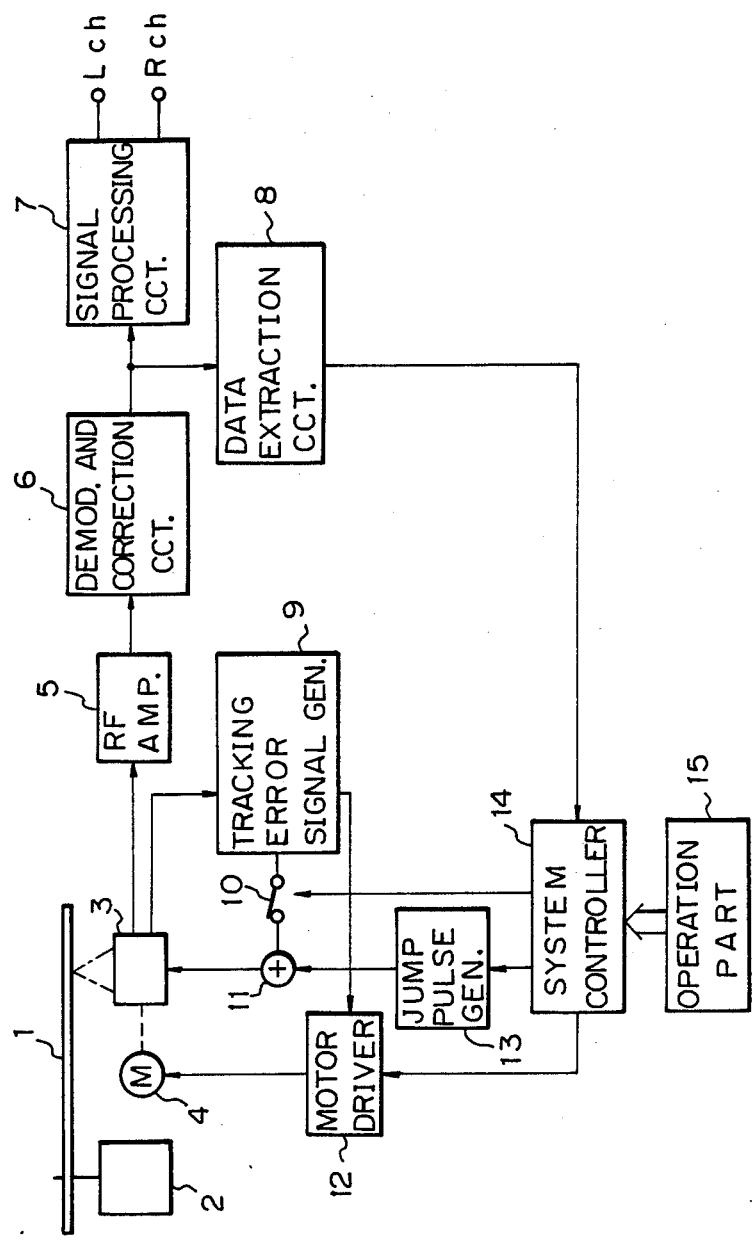
FIG. 4 is a block diagram showing an example of the construction of digital audio disk player in which the address search method according to the present invention is applied

FIG. 4 is a block diagram showing an example of the construction of a digital audio disk player in which the search method according to the present invention is suitably applied. In the figure, a digital audio disk 1 which will be simply referred to as a disk hereinafter is driven by means of a spindle motor 2, and information recorded thereon is read by an optical pickup 3. The pickup 8 incorporates therein an optical system including a laser diode, an objective lens, and a photo detector, a focus actuator for moving the objective lens along a direction of its optical axis with respect to an information recording surface of the disk 1, and a tracking actuator for shifting the beam spot (the information reading light spot) with respect to the recording track in a radial direction of the disk 1. The pickup 3 is mounted on a slider (not shown) which is movable along the radial direction of the disk 1, and a slider motor 4 is used as a source of driving force.

A read RF signal outputted by the pickup 3 is supplied, through an RF amplifier 5, to a demodulation and correction circuit 6 in which the demodulation and error correction operations are performed. An output signal of the demodulation and correction circuit 6 is transformed to left and right channel audio signals after being treated by a predetermined signal processing operation at a signal processing circuit 7, and directly supplied to a data extraction circuit 8, in which the address data recorded in the Q channel of the sub-code signal are extracted. The extracted address data is supplied to a system controller 14.

A tracking error signal generating circuit 9 is provided and it produces a tracking error signal which corresponds to the amount of deviation of the information reading light spot from a central line of the recording track in accordance with tracking detection information which is outputted by the pickup 3. This tracking error signal is supplied to one of two input terminals of an adder circuit 11 through a loop switch 10. A low frequency component of the tracking error signal is supplied to a motor drive circuit 12 as a drive voltage for driving the slider motor 4. To the other input terminal of the adder circuit 11, a jump pulse signal generated by a jump pulse generating circuit 13 are supplied. The jump pulse signal comprises an acceleration pulse and a deceleration pulse. An output signal of the adder circuit 11 is supplied to the tracking actuator incorporated in the pickup 3.

The system controller 14 is constituted by a microcomputer for example, and operates in such a manner that it determines a search direction by comparing the present address obtained at the data extracting circuit 8 and the target address, when a search command is generated upon designation of the target address through an operation of an operation part 15, and it drives a jump pulse generating circuit 13 to generate a jump pulse having a pulse width corresponding to the number of track sections to be jumped, and controls the loop switch to an open state when the jump operation is performed.

Steps of the searching method performed by the processor of the system controller 14 will be explained with reference to the flowchart of FIG. 6.

When the target address is designated by the operation part 15 and the search command is generated, the direction of search is, for example, determined to be a direction toward the outer periphery of the disk, by a comparison of magnitude between the target address and the present address obtained at the data extraction circuit 8. Subsequently, by controlling the driving of the jump pulse generation circuit 13, a jump pulse having a pulse width corresponding to 80 tracks, for example, is generated and a jumping of 80 tracks is performed, at a step $S_1$. Thereafter, a jump number counter incorporated therein is incremented at a step $S_2$, and subsequently it determines as to whether or not the count value of the counter has reached "3", for example at a step $S_3$. If the count value of the jump number counter has not reached "3", then the program returns to the step $S_1$ to that the jumping of 80 tracks is performed once again. If the count number "3" is reached, the jump number counter is reset at a step $S_4$. Then the tracking servo system is placed in the locked state and the present address obtained at the data extracting circuit 8 is read-in at a step $S_5$.

Then whether or not the target address and the present address are equal to each other is judged at a step $S_6$. If the addresses are equal to each other, the search operation is terminated. On the other hand, if the addresses are not equal to each other, whether or not the present address has passed the target address (the present address > the target address when the searching operation is directed toward the outer periphery, and the present address < the target address when the searching operation is directed toward the inner periphery) is judged at a step $S_7$. If the answer is negative, the program returns to the step $S_1$ and the above operation will be repeated.

Time chart of the above operation is illustrated in FIGS. 6A through 6D.

Among these figures, FIG. 5A shows a waveform of the tracking error signal, FIG. 5B shows a drive voltage (track jump pulse) of the tracking actuator, FIG. 5C shows a waveform indicating the open/close state of the tracking servo loop, and FIG. 5D shows the timing of the reading of the present address.

If, at the step $S_7$, it is judged that the present address has passed the target address, the jump pulse generation circuit 13 is operated to generate a jump pulse having a pulse width corresponding to a jumping of 64 tracks in an opposite polarity with respect to the 80-track jump pulse, at a step $S_8$. Subsequently, the tracking servo system is locked and the present address read from the data extracting circuit 8 is read-in, at a step $S_9$. Then, whether or not the present address and the target address is equal to each other is detected at a step $S_{10}$. If the answer is affirmative, whether or not the present address has passed the target address is judged at a step $S_{11}$. If the answer is negative, the program returns to the step $S_8$, to repeat the above described operations. If the answer is affirmative, the jump pulse generation circuit 13 is activated to generate a jump pulse having a pulse width corresponding to a jumping of 32 tracks, in a polarity opposite with respect to the 64-track jump pulse signal (in the same polarity as the 80-track jump pulse), so as to effect the jump operation of 32 tracks toward the outer periphery of the disk, at a step $S_{12}$. Subsequently, the tracking servo system is placed to the locked state, and the present address obtained from the data extraction circuit 8 is read-in, at a step $S_{13}$.

Subsequently, whether or not the present address and the target address are equal to each other is detected, at a step 14. If the answer is affirmative, the search operation will be terminated. On the other hand, if the answer is negative, whether or not the present address has passed the target address is detected at a step $S_{15}$. If the answer is negative, the program returns to the step $S_{12}$, to repeat the above operations. If the answer is affirmative, the jump pulse generation circuit 13 is activated to generate a jump pulse having a pulse width corresponding to a jumping of one track, in an opposite polarity with respect to the 32-track jump pulse, so that the jumping operation of one track in the direction toward the inner periphery of the disc is performed, at a step $S_{16}$. Thereafter, the tracking servo system operated to the locked state, and the present address obtained from the data extracting circuit 8 is read-in at a step $S_{17}$, and whether or not the present address and the target address are equal to each other is judged at a step $S_{18}$. If the answer is affirmative, the searching operation will be terminated. If the answer is negative, the program is returned to the step $S_{16}$, so as to repeat the above operations.

Figure 6:
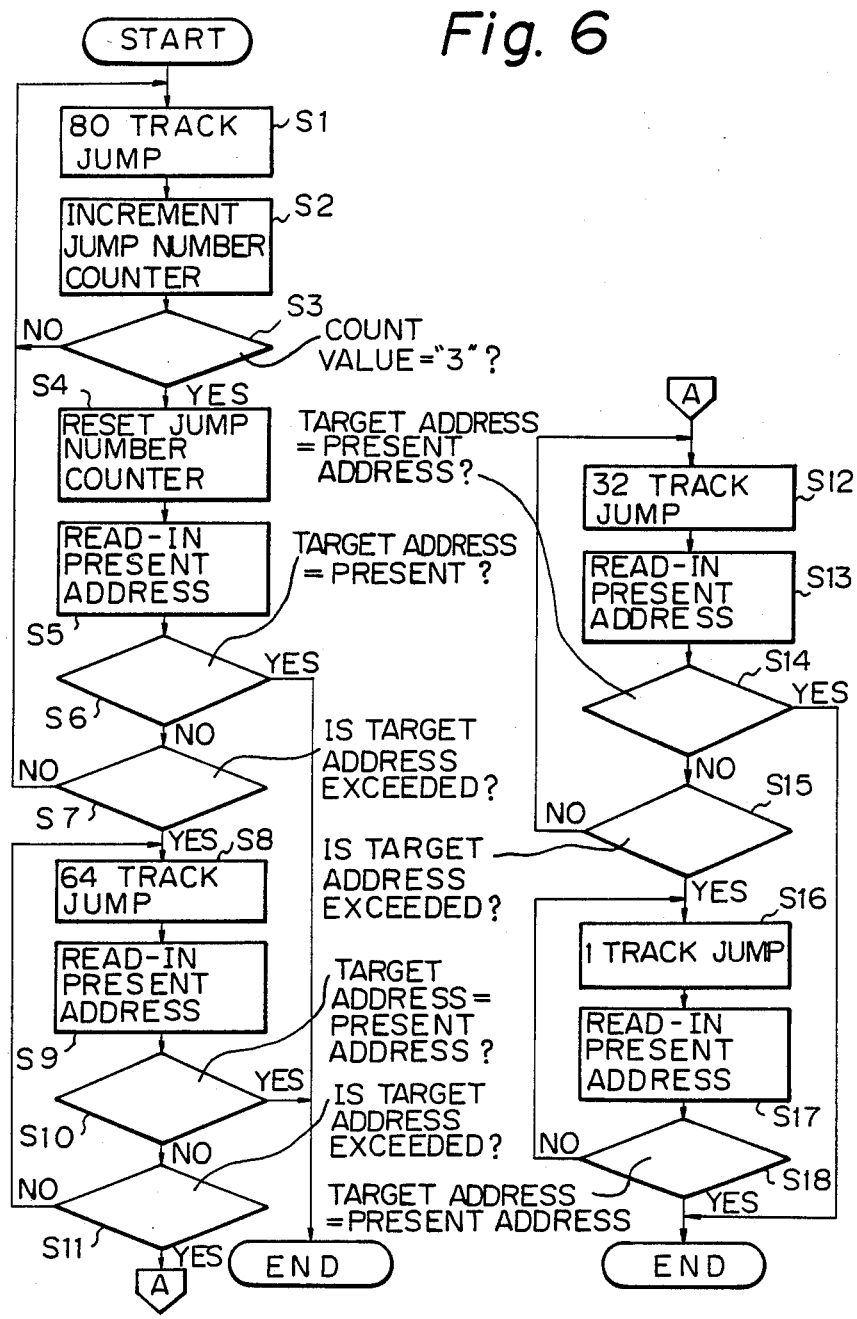
FIG. 6 is a flowchart showing the steps of the searching method which are performed by a processor.

As illustrated in FIG. 6, the operations described above are, in other words, at the start of the search, performing a 80-track jumping operation three times. Subsequently, the present address is read-in and compared with the target address, and this comparison operation is performed intermittently until the present address exceeds the target address. When the present address has passed the target address, the 64-track jump operation is performed in the reverse direction, and the 64-track track jump operation is repeated until the present address passes the target address. If the present address passes the target address by the repetition of the 64-track jump, the 32-track jump operation is performed in the reverse direction, and the 32-track jump operation is repeated until the present address passes the target address. At last, the one-track jump operation in the opposite direction with respect to the 32-track jump operation is repeated until the present address and the target address becomes identical with each other.

Thus, the jump operation for jumping a plurality of tracks is repeated and the present address is read-in intermittently, and compared with the target address, and this operation is repeated until the present address passes the target address, thereby to move the information reading light spot, nearer and eventually to the target address. The above described operation eliminates the necessity of computing the difference between the addresses, and only a comparison between the present address and the target address is required. Therefore, the number of steps of the operation program can be reduced considerably. Moreover, by repeatingly jumping a plurality of tracks, a slider having a relatively low speed of response can still sufficiently follow the jumping operation. Accordingly, the requirements for the accuracy or tolerance of the slider can be lessened within the tolerance range in which the slider can follow the track jump operation Thus, the method according to the present invention is greatly effective to reduce the cost of the system on the whole.

It is to be noted that the number of track jump operations and the number of jumped tracks are not limited to the value used in the above embodiment as they are used as an example only and those values can be determined arbitrarily.

The track jump operation for moving the information reading light spot over a number of recording tracks employed in the above embodiment will be further described.

Figure 7:
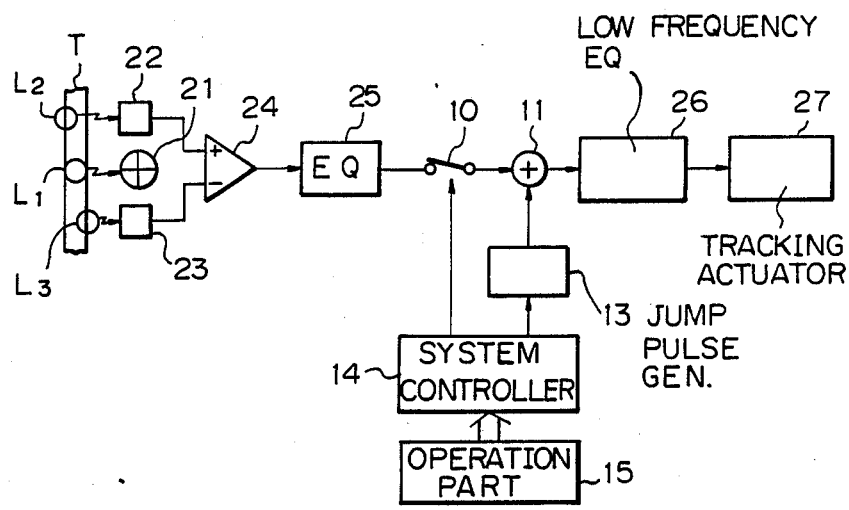
FIG. 7 is a block diagram showing an example of the tracking servo system.

FIG. 7 is a block diagram showing an example of tracking servo system. In the figure, three light beam spots obtained by converging a laser beam, i.e., the information reading light spot $L_1$ and a pair of light spots $L_2$ and $L_3$ for detecting tracking information are irradiated from a pickup (not shown) on a recording track T of the disk at positions as illustrated. The light spots $L_2$ precedes the information reading light spot $L_1$ and the light spot $L_3$ follows the latter under the relative movement of these light spots with respect to the recording disk.

The reflections of these light spots are received by photoelectric transducers 21 through 23 incorporated in the pickup.

The photoelectric transducer 21 is basically a quadrant light detector having independent four light receiving elements whose light receiving surfaces are bounded by two boundary lines crossing substantially at right angles with each other. The sum total of output signals of these four light receiving elements serves as an RF read output signal. On the other hand, output signals of the photo electric transducers 22 and 23 are supplied to a differential amplifier 24 by which a difference between those output signals is derived, and the difference output signal serves as the tracking error signal which indicates the distance of deviation, in the direction of disk radius, of the information reading light spot from a central line of the recording track T.

This tracking error signal is supplied, after being processed by a predetermined phase compensation operation at an equalizer 25, to a loop switch 10 and in turn supplied to an adder 11 as one of two inputs thereof. A jump pulse generated by a jump pulse generation circuit 13 is supplied to the other one of the inputs of the adder 11. The output signal of the adder 11 is supplied to a tracking actuator 27 through a low frequency equalizer 26. During the normal playing operation, the tracking actuator 27 is operative to shift the position of the information reading light spot $L_1$ in a direction and to a distance respectively corresponding to the polarity and level of the voltage applied thereto. Thereby the light spot $L_1$ accurately follows the central line of the recording track T. The above described elements together constitute the tracking servo loop.

The system controller 14 comprises a microcomputer for example, and opens the loop switch 10 in response to a jump command supplied from a control part 15. In addition, the system controller 14 operates the jump pulse generation circuit 13 so that it generates a jump pulse having a pulse width corresponding to the number of tracks to be jumped.

Figure 8:
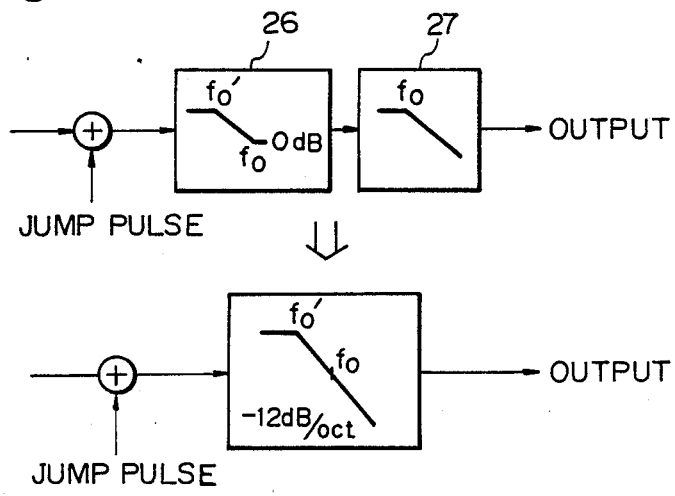
FIG. 8 is a diagram showing a transfer function from a circuit point at which the jump pulse is added to an output of the tracking actuator in a circuit wherein a low frequency equalizer circuit is provided.

The low frequency equalizer circuit 26 is inserted into the stage before the tracking actuator 27 in order to raise the gain of the tracking actuator 27 for frequencies below the resonance frequency $f_0$, and basically it is constructed as a lag-lead filter including a $-12$ dB/oct element. By inserting this low-frequency equalizer 9 before the actuator 27, the transfer function from the adder 11 to the tracking actuator 27 will become that as illustrated in FIG. 8, and it is an equivalence of a case that the low frequency resonance frequency of the tracking actuator 27 is reduced from $f_O$ to $f_{O'}$.

Thus, a tracking actuator equivalently having an extremely low resonance frequency $f_{O'}$ is obtained. As a result, the apparent frequency of generation of the jump pulse becomes sufficiently higher than the resonance frequency $f_{O'}$ even in the case of a track jump operation for jumping a number of tracks for which, as explained with reference to FIGS. 3A through 3D, the pulse width of the deceleration pulse should be adjusted if the tracking actuator having the resonance frequency $f_O$ is used. Therefore, the response characteristic such as shown in FIGS. 2A through 2D is obtained, and the track jump operation for jumping a number of recording tracks is realized without the necessity of the pulse width control of the deceleration pulse.

The tracking servo loop explained so far can be used in association with the address search method according to the present invention.

As described in the above, according to the address search method of the present invention, the operation of jumping a plurality of tracks are repeated a number of times, and the present address is read-in and compared with the target address intermittently, and this operation is repeated until the present address exceeds the target address, to move the information reading light spot nearer to the target address. Thus, the computation between the present address and the target address becomes completely unnecessary, so that the number of steps of the operation program can be reduced considerably.

What is claimed is:

1. An address search method for use in a disk player having a pickup for reading information from a plurality of tracks on a disk, said method comprising the steps of:
   (a) providing information relating to a target address to which it is desired to move said pickup;
   (b) jumping said pickup across the disk and over a first predetermined number of tracks in a first direction toward said target address;
   (c) detecting a current address of said pickup;
   (d) comparing the current address of said pickup with said target address;
   (e) repeating steps (b)–(d) if said pickup does not pass said address in step (b);
   (f) jumping said pickup across the disk and over a second predetermined number of tracks, less than said first predetermined number, in a second direction opposite to said first direction toward said target address if said pickup passes said target address in step (b) as determined in step (d);
   (g) detecting the current address of said pickup;
   (h) comparing the current address of said pickup with said target address;
   (i) repeating steps (f)–(h) if said pickup does not pass said target address in step (f);
   (j) decreasing said first and said second predetermined numbers and repeating steps (b)–(i) until the current address of said pickup equals said target address.

2. The method of claim 1, and further comprising the steps of:
   placing said pickup in a locked state to lock said light spot onto a track of said disk during said steps of comparing the current address with the target address; and
   withdrawing said pickup from said locked state during said steps of jumping said pickup to a new position on said disk.

3. An apparatus for performing an address search function in a disk player for reading information from a disk having a plurality of tracks of information thereon, said apparatus comprising:
   light beam projecting means for projecting a light spot onto a track of said disk;
   pickup means associated with said light beam projecting means for reading information from said disk;
   means for setting a target address to which it is desired to move said pickup;
   jumping means for jumping said pickup in a first direction toward said target address and in a second direction opposite said first direction;
   comparing means for comparing a current address of said pickup with the target address;
   control means connected to said jumping means, said comparing means, and said tracking servo means, and for controlling said jumping means to:
   (a) jump said pickup in a first jump in said first direction a first predetermined number of tracks toward said target address;
   (b) jump said pickup means in a second jump toward said target address a second predetermined number of tracks in said second direction if said pickup passes said target track in said first jump; or
   (c) repeat said first jump until said pickup means passes said target address and subsequently execute said second jump; and
   whereby said control means decreases said first and said second predetermined numbers until said current address of said pickup equals said target address.

4. An apparatus for performing an address search function in a disk player for reading information from a disk having a plurality of tracks of information thereon, said apparatus comprising:
   light beam projecting means for projecting a light spot onto a track of said disk;
   pickup means associated with said light beam projecting means for reading information from said disk;
   means for setting a target address to which it is desired to move said pickup;
   jumping means for jumping said pickup in a first direction toward said target address and in a second direction opposite said first direction;
   comparing means for comparing a current address of said pickup with the target address and issuing a signal representative thereof;
   tracking servo means for guiding said light beam projecting means to follow and not deviate from a track on said disk, said tracking servo means placing said light beam projecting means in a locked state during which said light spot is locked onto a track of said disk and withdrawing said light beam projecting means from said locked state;
   control means connected to said jumping means, said comparing means, and said tracking servo means, for controlling said jumping means to:

(a) jump said pickup in a first jump in said first direction a first predetermined number of tracks toward said target address; and (b) jump said pickup means in a second jump toward said target address a second predetermined number of tracks in said second direction if said pickup passes said target address in said first jump; or (c) repeat said first jump until said pickup means passes said target address and subsequently execute said second jump; and whereby said control means decreases said first and said second predetermined numbers until said current address of said pickup equals said target address.

5. The apparatus of claim 4, wherein said tracking servo means places said light beam projecting means in said locking state when said comparing means compares said current address with a target address, and withdraws said light beam projecting means from said locked state when said jumping means jumps said pickup across said disk.

* * * * *